United States Patent
Riddell

(10) Patent No.: US 8,942,450 B2
(45) Date of Patent: Jan. 27, 2015

(54) METHOD TO PROCESS IMAGES OBTAINED BY TOMOGRAPHY OR FEW VIEW TOMOSYNTHESIS

(75) Inventor: Cyril Riddell, Issy-les-Moulineaux (FR)

(73) Assignee: General Electric Company, Schenectady, NY (US)

(*) Notice: Subject to any disclaimer, the term of this patent is extended or adjusted under 35 U.S.C. 154(b) by 844 days.

(21) Appl. No.: 12/951,371

(22) Filed: Nov. 22, 2010

(65) Prior Publication Data

US 2011/0142317 A1 Jun. 16, 2011

(30) Foreign Application Priority Data

Dec. 15, 2009 (FR) ...................................... 09 58997

(51) Int. Cl.
*G06K 9/00* (2006.01)
*G06T 11/00* (2006.01)

(52) U.S. Cl.
CPC ......... *G06T 11/006* (2013.01); *G06T 2211/424* (2013.01); *G06T 2211/436* (2013.01)
USPC .............................................. 382/131; 378/4

(58) Field of Classification Search
CPC ............. G06K 9/00; H05G 1/60; A61B 6/00; G01N 23/00; G21K 1/12; G06T 11/006; G06T 2211/424; G06T 2211/436
USPC ......... 382/128, 130, 131, 154, 250, 260, 261; 378/4, 20, 21, 27; 250/363.04, 363.05, 250/583; 345/419, 501; 600/407, 425, 427
See application file for complete search history.

(56) References Cited

U.S. PATENT DOCUMENTS

| | | | |
|---|---|---|---|
| 6,272,200 B1 * | 8/2001 | Pan et al. | 378/15 |
| 7,447,295 B2 * | 11/2008 | Hoheisel et al. | 378/4 |
| 7,453,976 B1 * | 11/2008 | Yin | 378/9 |
| 7,760,848 B2 * | 7/2010 | DeMan et al. | 378/4 |
| 8,447,565 B2 * | 5/2013 | Kallman | 702/182 |
| 2004/0264626 A1 * | 12/2004 | Besson | 378/4 |
| 2005/0220265 A1 * | 10/2005 | Besson | 378/16 |

(Continued)

FOREIGN PATENT DOCUMENTS

| | | |
|---|---|---|
| JP | 63157046 A | 6/1988 |
| JP | 2007117736 A | 5/2007 |

(Continued)

OTHER PUBLICATIONS

LaRiviere et al. "Noise Properties of Periodic Interpolation Methods with Implications for Few-View Tomography" IEEE Transactions on Nuclear Science, vol. 46, No. 3, Jun. 1999 (pp. 639-645) (1-7).*

(Continued)

*Primary Examiner* — Chan Park
*Assistant Examiner* — Mia M Thomas
(74) *Attorney, Agent, or Firm* — GE Global Patent Operation; Marc A. Vivenzio

(57) ABSTRACT

The invention concerns the reconstruction of a two-dimensional (2D) or three-dimensional (3D) image of an object, for example part of a region of interest in a patient, on the basis of a set of a one-dimensional or two-dimensional views respectively of the region of interest, taken from different positions by an imagining system around the region of interest. The invention finds particular application in medical imaging by tomography reconstruction of Few-View Tomography.

6 Claims, 2 Drawing Sheets

(56) References Cited

U.S. PATENT DOCUMENTS

| | | | |
|---|---|---|---|
| 2005/0259855 A1* | 11/2005 | Dehmeshki | 382/131 |
| 2006/0072801 A1* | 4/2006 | Deman et al. | 382/131 |
| 2007/0093711 A1* | 4/2007 | Hoheisel et al. | 600/407 |
| 2007/0098135 A1 | 5/2007 | Kunze | |
| 2007/0176087 A1* | 8/2007 | Wang et al. | 250/252.1 |
| 2007/0217566 A1* | 9/2007 | Chen et al. | 378/4 |
| 2008/0031400 A1* | 2/2008 | Beaulieu et al. | 378/4 |
| 2010/0121183 A1* | 5/2010 | Taguchi et al. | 600/427 |
| 2011/0044546 A1* | 2/2011 | Pan et al. | 382/195 |
| 2011/0142317 A1* | 6/2011 | Riddell | 382/131 |
| 2011/0292761 A1* | 12/2011 | Jiao et al. | 367/21 |
| 2012/0020448 A1* | 1/2012 | Khare et al. | 378/4 |
| 2012/0140876 A1* | 6/2012 | Jung et al. | 378/20 |
| 2012/0230569 A1* | 9/2012 | Riddell | 382/131 |
| 2013/0002659 A1* | 1/2013 | Jiang et al. | 345/419 |
| 2013/0272490 A1* | 10/2013 | Noguchi | 378/4 |

FOREIGN PATENT DOCUMENTS

| | | |
|---|---|---|
| JP | 2007117740 A | 5/2007 |
| JP | 2008062035 A | 3/2008 |
| JP | 2009153928 A | 7/2009 |
| WO | 2006108926 A1 | 10/2006 |
| WO | 2007212082 A2 | 1/2007 |

OTHER PUBLICATIONS

Manjeshwar et al. "Fully 3D PET Iterative Reconstruction Using Distance Driven Projectors and Native Scanner Geometry" 2006 IEEE Nuclear Science Symposium Conference Record M11-392, pp. 1-4.*

Kunze, H. et al. "Filter determination for Tomosynthesis aided by iterative reconstruction techniques", 9th Internation Meeting on Fully Three-Dimentional Image Reconstruction in Radiology and Nuclear Medicine, Jul. 9, 2007, pp. 309-312.

Landweber L, "An iteration formula for fredholm integral equations of the first kind", American Journal of Mathematics, Johns Hopkins Universidty Press, Baltimore, US, vol. 73, No. 3, Jan. 1, 1951, pp. 615-624.

Ciarlet, P.G., "8.5 Conjugate gradient methods for unconstrained problems", IN: "Introduction to numerical linear algebra and optimization", Press Syndicate of the University of Cambridge, 1989, pp. 311-321.

Riddell, Cyril, "Tomographic Reconstruction Through View-based Implementation of Least-Square algorithms", First International Conference on Image Formation in X-Ray Computed Tomography, Jun. 6, 2010, pp. 220-223, URL:http://www.ucairmed.utah.edu/CTmeeting/.

Delaney, Alexander H. et al, "A fast and Accurate Fourier Algorithm for Iterative Parallel-Beam Tomography", IEEE Transactions on Image Processing, vol. 5, No. 5, May 1, 1996.

Benali H. et al., "Diffusion Regularization for Iterative Reconstruction in Emission Tomography", IEEE Transactions on Nuclear Science, vol. 52, No. 3, Jun. 1, 2005 pp. 669-675.

Riddell, Cyril, et al., "Interative Reconstruction of SPECT Data With Adaptive Regularization", IEEE Transactions on Nuclear Science, vol. 49, No. 5, Oct. 1, 2002.

Qu, Gang-Rong, et al., "Landweber iterative methods for angle-limited image reconstruction", ACTA Mathematica Applicatae Sinica, Springer, Berlin, Germany, vol. 25, No. 2, Mar. 17, 2009, pp. 327-334.

Jang, Byunghyun, et al., "Multi GPU implementation of iterative tomographic reconstruction algorithms", BioMedical Imaging: from Nano to Macro, ISBI 2009, Jun. 28, 2009, pp. 185-188.

French Search Report from Fr Application No. 0958997 dated Jul. 15, 2010.

Unofficial translation of Japanese Office Action from JP Application No. 2010-273080 dated Jul. 9, 2014.

* cited by examiner

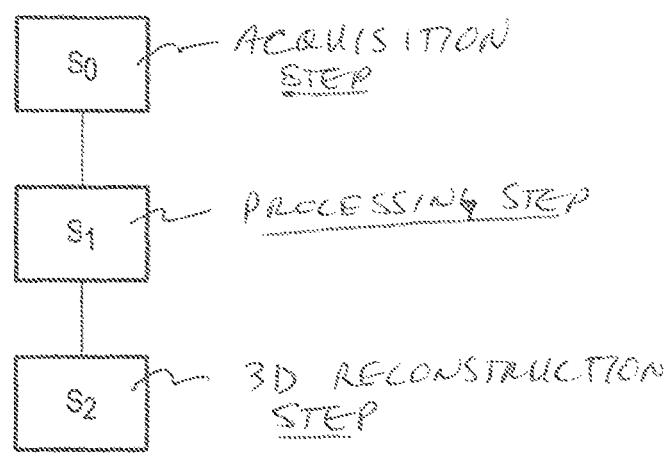
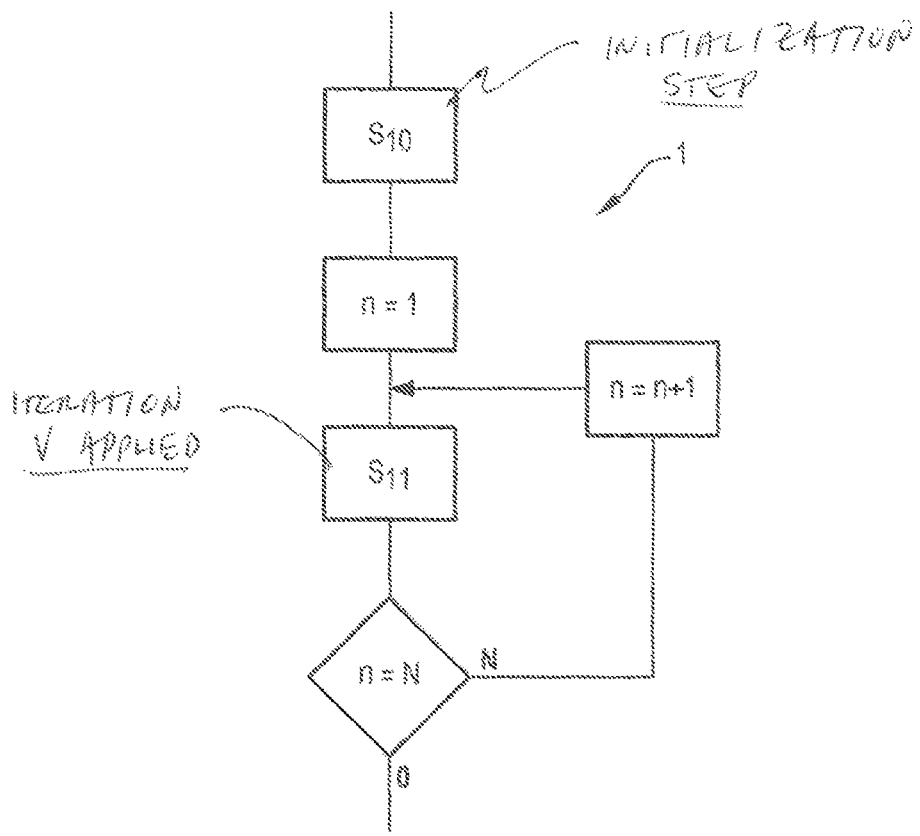

US 8,942,450 B2

METHOD TO PROCESS IMAGES OBTAINED BY TOMOGRAPHY OR FEW VIEW TOMOSYNTHESIS

BACKGROUND OF THE INVENTION

1. Field of the Invention

The invention concerns the reconstruction of a two-dimensional (2D) or three-dimensional (3D) image of an object, for example part of a region of interest in a patient, on the basis of a set of one-dimensional or two-dimensional views respectively of the region of interest, taken from different positions by an imaging system around the region of interest. The invention finds particular application in medical imaging by tomography reconstruction or Few-View Tomography.

2. Description of the Prior Art

With tomography it is possible to produce slice images of a region of interest of an object, by acquiring projections.

FIG. 1 schematically illustrates the acquisition of 2D images of a body organ and the reconstruction of this organ as a 3D image by tomosynthesis.

X-rays R derived from a source S are emitted at different angles ($1, \ldots, i, \ldots, n$) towards the organ O. After passing through the organ they are detected by the detector $D_{ct}$ forming a set of 2D projections, $s_1, \ldots, s_i, \ldots, s_n$. It is to be noted that there are as many acquired 2D projections as there are angles under consideration. If all the angles cover at least a semicircle, the term tomography is used. When this condition cannot be met (for example: arc of a circle of less than 180 degrees, straight line) the term tomosynthesis is used.

Acquisition is obtained using a detector positioned facing an X-ray source, e.g. a digital camera.

One application of tomography is the detection and characterization of a lesion in an organ, e.g. a cancer lesion. For the breast, tomosynthesis is used.

The acquired 2D projections are used to reconstruct a 3D image of the object. This 3D image is more precisely a 3D map of the X-ray attenuation coefficients of the medium through which the rays have passed.

It is this mapping that is used by a radiologist to interpret this image in relation to the observed differences in contrast.

3D reconstruction of the image is a costly, complex operation, in particular if it uses an iterative algorithm.

An iterative 3D reconstruction method is known. This method is based on a discrete, matrix expression of the topographic reconstruction problem.

More precisely the problem can be modelled by the following equation:

$$Rf=s$$

in which s is a vector of the acquired projections, R is a projection operator which models the topographic imaging system and f is the 3D image of the object to be reconstructed.

The problem to be solved with tomographic reconstruction is to determine f having knowledge of s and R.

Exact reconstruction of the 3D image f in theory requires a set of measurements at least as large as the number of unknowns forming the 3D image, measured under the constraints of tomography i.e. measurements with a very small sampling pitch and a rotation of 180 degrees about the object.

In practice, this may prove to be impossible for the following reasons:

Firstly, in examinations of tomosynthesis type, it is not possible to obtain measurements at 180° around the object to be imaged, and secondly the smaller the sampling pitch the higher the number of measurements, which increases the duration of examinations and hence the applied X-ray dose.

Therefore the case is frequently encountered in tomography in which the size of the 3D image is much larger than the size of the data, which implies solving a system having a very high number of possible solutions.

The choice of reconstruction method allows a 3D image to be found that is an acceptable solution for the intended application.

Additionally, known space reconstruction methods of 3 images are in the form of an iterative algorithm defined by its iteration A which generates a reconstruction $f^{(n)}$ of the solution from a reconstruction $f^{(n-1)}$ such that:

$$f^{(n)}=A[f^{(n-1)}].$$

Starting with an initial reconstruction denoted $f^{(0)}$ in the series of reconstructions $f^{(n)}$, the reconstruction at iteration N is obtained as:

$$f^{(N)} = A[f^{(N-1)}] = A[A[f^{(N-2)}]] = A^2[f^{(N-2)}] = \ldots = A^i[f^{(N-i)}] = \ldots = A^N[f^{(0)}].$$

This algorithm requires the storing of initialization steps, of intermediate reconstructions and archiving of the reconstruction, i.e. one or more 3D images depending on whether storing is made simultaneously or successively, and represents a generated amount of data that is much greater than the amount of acquired data (low number of projections).

Some known methods use discrete, matrix (hence linear) operations. Some are associated with solving the linear system $Rf=s$, others are associated with minimization of the quadratic error $\|Rf-s\|^2$ sir and of the associated system $R'Rf=R's$ in which R' is the transposed matrix of R, others generalize the preceding approach by solving a system $\overline{R}Rf=\overline{R}s$ in which $\overline{R}$ is a matrix such that $\overline{R}Rf$ is a 3D image. Reference can be made to the document <<CIARLET, P. G., *Introduction á l'Analyse Numerique Mairieielle el á l'Optinnsation*, Masson. Paris, 1982>>.

More recently, it was proposed to calculate a filter iteratively, and once and for all, the filter being obtained by iterative reconstruction of a test object and to apply this filter to every object to be imaged at the acquired projections in order to obtain the reconstructed volume of the object without any iterative computing. In this respect, reference can be made to document U.S. Pat. No. 7,447,295. In this way, the required computing power is reduced compared with iterative methods. However, the substitution of iterative reconstruction by filtering generates loss of data. It is therefore a near-approach method.

SUMMARY OF THE INVENTION

The invention proposes an iterative method which does not necessitate the storage of intermediate 3D images.

According to a first aspect, the invention concerns a method to process images obtained by tomography or tomosynthesis comprising: an acquisition step to acquire a plurality of 2D projection images of an object, acquisition being defined by $Rf=s$ in which s is a vector of the acquired projections, R is a projection operator which models the imaging system and f is the 3D image of the object to be reconstructed having knowledge of R and s: a processing step to process the acquired 2D projection images.

The method according to the first aspect of the invention is characterized in that processing of the projection images consists of applying an iterative algorithm defined by its iteration V which at each iteration, n=1, . . . , N generates at least one set of processed projection images $p^{(n)}$.

Iteration V is defined so that at each iteration the 3D image of the object is a linear function of the processed 2D projection images according to the property $f^{(n)}=\overline{R}p^{(n)}$, in which $\overline{R}$ is a matrix such that $\overline{R}Rf$ is a 3D image.

Having regard to the constraint associated with the iterative algorithm V, only one set of 2D projection images is handled. This avoids, at any time in the method (initialization n=0, intermediate computing 0<n<N, archiving n=N) having to store the entirety of a 3D image whose size is much larger than the set of acquired measurements.

Also, the equation $f^{(N)}=\overline{R}p^{(N)}$ is determined in sufficiently simple manner so as only to be calculated during the viewing step. In particular, this equation requires all the processed 2D images $p^{(N)}$, but only the computing and storing of that part of $f^{(N)}$ which is viewed.

Since it is neither possible nor necessary to view all the section planes of a volume simultaneously, but only successively, it is never necessary to use storage means covering the entire size of the 3D image $f^{(N)}$. To summarize, the storing of an entire 3D image is necessary neither during the reconstruction step, nor during archiving, nor during the viewing step.

For known algorithms defined by their iteration A associated with the matrix $\overline{R}R$ in the 3D image domain which therefore requires the handling, storing and archiving of at least one stored 3D image in its entirety, it is shown that there exists an algorithm defined by iteration V which generates a sequence of images processed in the form of 2D projection images and a linear constraint R allowing the generation of a reconstruction of the object from processed projections, such that the reconstructions obtained by V and $\overline{R}$ are mathematically equivalent to those generated by A, without it ever being necessary to store the entirety of a 3D image.

Also, the computing time is proportional to the sampling of each 3D image to be reconstructed, whereas the size occupied by storing 2D projection images is constant.

It is therefore possible to adjust the sampling of the reconstructed 3D image beyond the storage capacities of a processing unit under consideration, and therefore to implement on this unit an iteration V equivalent to an iteration A that cannot be implemented on this unit but only on another, considerably increased storage unit.

Other characteristics of the method according to the first aspect of the invention are the following:

the method comprises a 3D reconstruction step (S2) of the object to be determined $f^{(N)}=\overline{R}p^{(N)}$ in which N is the number of fixed iterations;

at each iteration n=1, . . . , N, the algorithm V generates a set of processed projection images $p^{(n)}=V[p^{(n-1)}]$, iteration V being defined for any vector p in space of the 2D projection images in the following manner $V[p]=(1-\rho R\overline{R})p+\rho s$ in which $p^{(0)}=\rho s$ or else $p^{(0)}=0$, s is the set of acquired 2D projection images, ρ is a parameter fixed so that $\|I-\rho \overline{R}R\|<1$ and therefore guarantees convergence of the method and I is the square unit matrix.

at each iteration, the algorithm V generates the sets of processed projection images $(p^{(n)}, q^{(n)}, t^{(n)})=V[(p^{(n-1)}, q^{(n-1)}, t^{(n-1)})]$ using the conjugate gradient method, typically given by:

$$\begin{cases} \alpha^{(n-1)} = -\langle q^{(n-1)}, RR^t t^{(n-1)}\rangle / \langle RR^t t^{(n-1)}, RR^t t^{(n-1)}\rangle \\ p^{(n)} = p^{(n-1)} + \alpha^{(n-1)} t^{(n-1)} \\ q^{(n)} = q^{(n-1)} + \alpha^{(n-1)} RR^t t^{(n-1)} \\ \beta^{(n-1)} = \langle q^{(n)}, RR^t q^{(n)}\rangle / \langle q^{(n-1)}, RR^t q^{(n-1)}\rangle \\ t^{(n)} = q^{(n)} + \beta^{(n-1)} t^{(n-1)}, \end{cases}$$

in which p, q, t are such that $p^{(0)}$ is arbitrary, typically zero or equal to s the vector of the acquired 2D projection images, and $q^{(0)}=t^{(0)}=RR^tp^{(0)}-s$.

at each iteration, the algorithm $V_{\theta(n)}$ generates a set of projection images $p^{(n)}=V_{\theta(n)}[p^{(n-1)}]=V_{\theta(n)}V_{\theta(n-1)}[p^{(n-2)}]=V_{\theta(n)}V_{\theta(n-1)}\ldots V_{\theta(1)}[p^{(0)}]$ with $V_{\theta(n)}[p]=(I_{\theta(n)}-\rho_{\theta(n)}I_{\theta(n)}R\overline{R})p+\rho_{\theta(n)}I_{\theta(n)}s+I_{\phi(n)}p$ in which θ(n) and φ(n) are respectively a First and a second sub-set of indices of acquired projective measurements, defined for each iteration n, the two sub-sets being separate, their joining indexing the totality of the vector s of the acquired 2D projection images, and $I_{\theta(n)}$ and $I_{\phi(n)}$ are matrices whose coefficients are all zero except for the indices of the diagonal belonging to θ(n) and φ(n) respectively in which they equal 1, so that $p=I_{\theta(n)}+p+I_{\theta(n)}p$, in which $p^{(0)}=\rho_{\theta(0)}I_{\theta(0)}s$ or else $p^{(0)}=0$, and $\rho_{\theta(n)}$ is a fixe parameter so that $\|I_{\theta(n)}-\rho_{\theta(n)}\overline{R}R\|<1$ and therefore guarantees convergence of the method;

the method comprises extraction of a slice derived from the reconstructed 3D image;

the method comprises arbitrarily Fine adjustment of sampling of the 3D image.

According to a second aspect, the invention concerns a medical imaging system comprising means to implement a method according to the first aspect of the invention.

According to a third aspect, the invention concerns a computer programme product comprising programme code instructions to carry out the steps of the method according to the first aspect of the invention.

BRIEF DESCRIPTION OF THE DRAWINGS

Other characteristics and advantages of the invention will become apparent from the following description which is solely illustrative and non-limiting and is to be read with reference to the appended drawings in which, in addition to FIG. 1 already described:

FIG. 3 schematically illustrates the steps of the method according to the invention;

FIG. 4 schematically illustrates in detail a step of the method of the invention.

DETAILED DESCRIPTION OF THE INVENTION

Medical Imaging System

Figure 1:
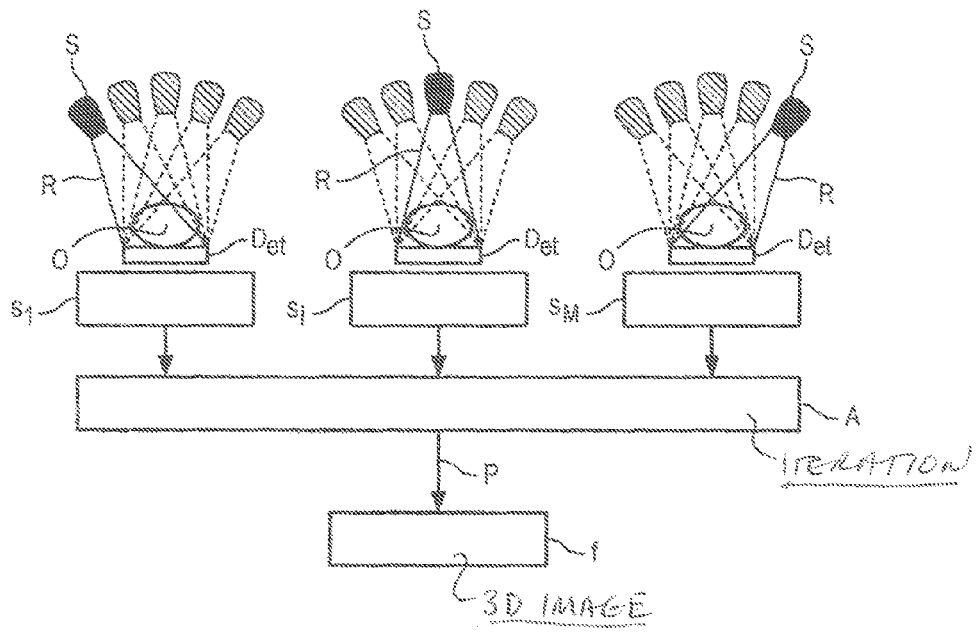
Figure 2:
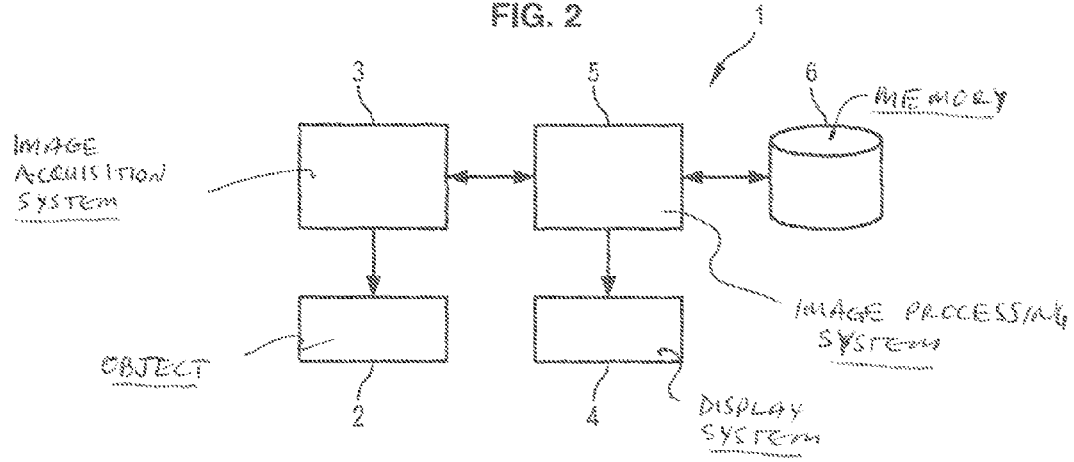
FIG. 2 schematically illustrates a medical imaging system to implement the method of the invention.

FIG. 2 schematically illustrates a medical imaging system 1 for the acquisition of 2D projection images to reconstruct a 3D image of an organ.

Said system may be mammography apparatus for the detection and characterization of lesions in the screening, diagnosis and treatment of breast cancer.

The medical imaging system 1 comprises an image acquisition system 3, an image processing system 5 and a display system 4.

The acquisition system 3 is used to acquire a plurality of 2D projections of a region of interest—an organ—in a patient.

The acquisition system 3 notably consists of a detector $D_{et}$ positioned facing an X-ray source. The detector is a digital camera for example. The acquisition system is an acquisition system by X-rays, the system comprising any known means permitting the emission of X-rays onto the object 2 and acquisition of the resulting images.

The display system 4 can be integrated in the image acquisition system 3 or the image processing system 5, or it can be separated from the acquisition system 3 and the processing system 5. The display system 4 is for example a computer screen, a monitor, flat screen, plasma screen or any type of known commercially available display device. The display system 4 provides the practitioner with control over the reconstruction and/or display of the acquired 2D images.

The processing system 5 is adapted for implementation of processing methods (e.g. reconstruction of a 3D image from 2D images). The processing system 5 can be integrated in the image acquisition system 3 or be separate from the image acquisition system 3. The processing system 5 is for example one or more computers, one or more processors, one or more microcontrollers, one or more micro-computers, one or more programmable logic controllers, one or more specific application integrated circuits, other programmable logic circuits or other devices which include a computer such as a work station. The processing system 5 is coupled with memory means 6 which can be integrated in or separate from the processing system 5. These means may consist of a hard disk or SSD, or any other removable re-write storage means (USB keys, memory cards etc.). These memory means may serve to store a 3D image of the region of the organ viewed as an acquired or processed 2D image. They may be a ROM/RAM memory of the processing system 5, a USB key, a memory card, a central server memory. The processing system 5 may comprise a read device (not shown) e.g. a disk reader or CD-ROM reader to read the instructions of the processing method (which is described below) from an instruction medium (not shown) such as a disk or CD-ROM or more generally any removable memory medium or even via a network connection. As a variant, the processing system 5 may comprise a wire or wireless network connection device (not shown). As a variant, the processing system 5 carries out the instructions of the processing method (described below) stored in microsoftware (not shown).

General Description of the Image Processing Method

The image processing method comprises an acquisition step S0 to acquire a plurality of 2D projection images $s_i$, i=1, ..., M>1, M being the number of acquired 2D projection images of an object, and a processing step S1 to process the acquired 2D projection images.

It is the optimization of the processing step S1 which makes it possible to limit the memory needs for storage of the 3D reconstruction.

More precisely, an iterative algorithm is applied to the acquired projection images to obtain processed 2D projection images p at each iteration so that, at each iteration n, the 3D image of the object is a linear function of the processed 2D projection images.

In particular, the algorithm is defined by its iteration V which generates a set of processed projection images $p^{(n)}V[p^{(n-1)}]=V^n[p^{(0)}]$ so that at each iteration n=1, ..., N the 3D image of the object is a linear function of the processed 2D projection images, according to the property: $f^{(n)}=\bar{R}p^{(n)}$. It is this equation which shows that, at each iteration n, it is possible simply to use a set of 2D projections to arrive at a reconstructed 3D image of the object.

It is noted that the processing step S1 comprises an initialization step S10 and a step S11 during which iteration V is applied (see FIG. 4).

The processing step only requires storage of the sets of images (acquired and/or processed) instead of volumes.

Three algorithms are detailed below that are used in the 2D image domain. For each of these algorithms, their equivalence with a known iterative reconstruction algorithm is shown used in the 3D image domain.

First Algorithm

A first conventional algorithm called <<successive approximations>>, consists of iteration A defined as follows:

$A[f]=(I-\rho\bar{R}R)f+\rho\bar{R}s.$ in which I is the square unit matrix whose coefficients are all zero except on the diagonal where they equal 1, $\bar{R}$ is a matrix such that $\bar{R}Rf$ is a 3D image, and $\rho$ an a priori fixed parameter so that $\|I-\rho\bar{R}R\|<1$ to guarantee convergence of the method.

It is known that the algorithm converges towards a solution of the system $\bar{R}Rf=\bar{R}s$. If $\bar{R}$ is reversible, this solution also meets Rf=s.

If $\bar{R}=R'$, the estimate sequence converges towards a solution such that:

$$\lim_{n \to (1)} A^n[f^{(0)}] = f^* = \min_f \|Rf - s\|^2.$$

In practice, a sufficiently large integer N is fixed for which $f^{(n)}=A[f^{(n-1)}]$ is computed for n=1, ..., N with $f^{(0)}=\bar{R}p^{(0)}$ with $p^{(0)}=0$ or $p^{(0)}=\rho s$.

It is ascertained that in this standard algorithm, at each iteration, 3D images are handled (f, $\rho\bar{R}Rf$, $\rho\bar{R}s$, A[f]) which necessitates the storing of a high number of data (the entirety of at least one 3D image).

So as only to have 2D images to store, the algorithm defined by iteration V is applied, b computing the estimate sequence $p^{(n)}=V[p^{(n-1)}]$ for n=1, ..., N with $p^{(0)}=0$ or $p^{(0)}=\rho s$, i.e. such that $f^{(0)}=\bar{R}p^{(0)}$.

Iteration V is defined for any vector p in space of the 2D projection images in the following manner:

$V[p]=(I-\rho R\bar{R})p+\rho s.$

It is noted that if $f=\bar{R}p$ we have:

$$\bar{R}(V[p]) = \bar{R}(I - \rho R\bar{R})p + \rho\bar{R}s$$
$$= (I - \rho\bar{R}R)f + \rho\bar{R}s$$
$$= A[f].$$

Therefore, with simple recurrence it has been shown that if $f^{(0)}=\bar{R}p^{(0)}$ the two algorithms, one defined in the 2D image domain by iteration V and the other in the 3D image domain by iteration A, give the same succession of 3D images $f^{(n)}$ since it has been shown that:

$f^{(n)}=A^n[f^{(0)}]=\bar{R}p^{(n)}=\bar{R}V^n[p^{(0)}].$

It is to be pointed out, however, that this is not the case if there is the constraint p=Rf since this would give:

$$R(A[f]) = R(I - \rho\bar{R}R)f + \rho R\bar{R}s$$
$$= (I - \rho\bar{R}^t R)p + \rho R\bar{R}s$$
$$\neq V[p].$$

Second Algorithm

In the particular case in which $\bar{R}=R'$, the first algorithm—described above—gives us a solution to a quadratic optimization problem.

However, it is known that the algorithm of the conjugate gradient gives us a more efficient solution to this optimization problem, in that a largely reduced number of iterations needs to be computed to obtain a visually acceptable image.

On the other hand, from a storage viewpoint, the conjugate gradient requires much more storage capacity than the first described algorithm.

It will be shown below that it can be implemented both in the 2D projection image domain and in the 3D image domain.

In manner known per se, in the 3D image domain, the algorithm of the conjugate gradient can be implemented by defining iteration A as follows:

$$(f^{(n)}, r^{(n)}, d^{(n)}) = A[(f^{(n-1)}, r^{(n-1)}, d^{(n-1)})]$$

with:

$$\begin{cases} \alpha^{(n-1)} = -\langle r^{(n-1)}, d^{(n-1)} \rangle / \langle R^t R d^{(n-1)}, d^{(n-1)} \rangle \\ f^{(n)} = f^{(n-1)} + \alpha^{(n-1)} d^{(n-1)} \\ r^{(n)} = r^{(n-1)} + \alpha^{(n-1)} R^t R d^{(n-1)} \\ \beta^{(n-1)} = \langle r^{(n)}, r^{(n)} \rangle / \langle r^{(n-1)}, r^{(n-1)} \rangle \\ d^{(n)} = r^{(n)} + \beta^{(n-1)} d^{(n-1)}, \end{cases}$$

in which R is the matrix modelling the acquisition system and R' the transposed matrix, $f^{(n)}$ is an estimated 3D image of the solution to the problem at iteration n, $r^{(n)}$ and $d^{(n)}$ are auxiliary 3D images, and <,> symbolizes the scalar product of two vectors so that $\alpha$ and $\beta$ are two real numbers.

The three vectors in space of the 3D images are initialized as follows:

$$f^{(0)} = R'p^{(0)}, r^{(0)} = d^{(0)} = R'(Rf^{(0)} - s)$$

in which s is the set of acquired 2D projection images, $p^{(0)}$ is arbitrary but in practice is chosen to be equal to 0 or s.

It is simply ascertained that said implementation requires the storing of four volumes at the same time: $f^{(n)}$, $r^{(n)}$, $d^{(n)}$, $R'Rd^{(n)}$.

As previously, it is possible to dispense with the storage of these 3D images by changing the following variables:

the settings for this purpose are 
$$\begin{cases} p^{(n)} \text{ such that } f^{(n)} = R^t p^{(n)} \\ q^{(n)} \text{ such that } r^{(n)} = R^t q^{(n)} \\ t^{(n)} \text{ such that } d^{(n)} = R^t t^{(n)}. \end{cases}$$

in which $(p^{(n)}, q^{(n)}, t^{(n)})$ is a trio of vectors in space of the 2D projection images. The vector $p^{(0)}$ is initialized as for iteration A, and $$q^{(0)} = t^{(0)} = RR'p^{(0)} - s$$

Iteration V is defined as follows:

$$(p^{(n)}, q^{(n)}, t^{(n)}) = V[(p^{(n-1)}, q^{(n-1)}, t^{(n-1)})] \text{ with}$$

$$\begin{cases} \alpha^{(n-1)} = -\langle q^{(n-1)}, RR^t t^{(n-1)} \rangle / \langle RR^t t^{(n-1)}, RR^t t^{(n-1)} \rangle \\ p^{(n)} = p^{(n-1)} + \alpha^{(n-1)} t^{(n-1)} \\ q^{(n)} = q^{(n-1)} + \alpha^{(n-1)} RR^t t^{(n-1)} \\ \beta^{(n-1)} = \langle q^{(n)}, RR^t q^{(n)} \rangle / \langle q^{(n-1)}, RR^t q^{(n-1)} \rangle \\ t^{(n)} = q^{(n)} + \beta^{(n-1)} t^{(n-1)}, \end{cases}$$

then, $f^{(N)} = R'p^{(N)}$ is determined, in which f is the 3D image of the object to be reconstructed.

With this algorithm, it is indeed ascertained that at each iteration only 2D images are stored, which makes it possible to obtain a reconstruction that is less costly in terms of memory needs.

Therefore, it is possible to replace the intermediate steps $f^{(n)}, r^{(n)}, d^{(n)}, R'Rd^{(n)}$ in the 3D image domain by intermediate steps in the 2D image domain: $s^{(n)}, r^{(n)}, q^{(n)}, RR'q^{(n)}$. The equivalence is shown below between iteration A and iteration V of the conjugate gradient algorithm.

It is first shown that for any n=1, . . . , N, the scalar products $\alpha$ and $\beta$ are the same for iteration A in the 3D image domain as for iteration V in the 2D image domain, since:

$$\alpha^{(n)} = -\langle r^{(n)}, d^{(n)} \rangle / \langle R^t R d^{(n)}, d^{(n)} \rangle$$
$$= \langle R^t q^{(n)}, R^t t^{(n)} \rangle / \langle R^t R R^t t^{(n)}, R^t t^{(n)} \rangle$$
$$= -\langle q^{(n)}, RR^t t^{(n)} \rangle / \langle RR^t t^{(n)}, RR^t t^{(n)} \rangle$$

and $$\beta^{(n)} = \langle r^{(n+1)}, r^{(n+1)} \rangle / \langle r^{(n)}, r^{(n)} \rangle$$
$$= \langle R^t q^{(n+1)}, R^t q^{(n+1)} \rangle / \langle R^t q^{(n)}, R^t q^{(n)} \rangle$$
$$= \langle q^{(n+1)}, RR^t q^{(n+1)} \rangle / \langle q^{(n)}, RR^t q^{(n)} \rangle$$

Given that:

$$f^{(n)} = R'p^{(n)}, r^{(n)} = R'q^{(n)}, d^{(n)} = R't^{(n)}, RR't^{(n)}, RR'q^{(n)}$$

this leads to obtaining the following equivalences between iteration V in the 2D image domain and iteration A in the 3D image domain:

$$\begin{cases} f^{(n)} = R^t p^{(n)}, r^{(n)} = R^t q^{(n)}, d^{(n)} = R^t t^{(n)}, RR^t t^{(n)}, RR^t q^{(n)} \\ q^{(n)}, RR^t t^{(n)} \Rightarrow \alpha^{(n)} \\ p^{(n+1)} = p^{(n)} + \alpha^{(n)} t^{(n)} \Rightarrow f^{(n+1)} = f^{(n)} + \alpha^{(n)} d^{(n)} \\ q^{(n+1)} = q^{(n)} + \alpha^{(n)} RR^t t^{(n)} \Rightarrow r^{(n+1)} = r^{(n)} + \alpha^{(n)} R^t R d^{(n)} \\ RR^t q^{(n+1)} \Rightarrow \beta^{(n)} \\ t^{(n+1)} = q^{(n+1)} + \beta^{(n)} t^{(n)} \Rightarrow d^{(n+1)} = r^{(n+1)} + \beta^{(n)} d^{(n)} \\ RR^t t^{(n+1)} = RR^t q^{(n+1)} + \beta^{(n)} RR^t t^{(n)} \Rightarrow \alpha^{(n+1)}, \end{cases}$$

we therefore obtain:

$$\begin{cases} p^{(0)} \Rightarrow f^{(0)} = R^t p^{(0)} \\ q^{(0)} = t^{(0)} = RR^t p^{(0)} - s \Rightarrow r^{(0)} = d^{(0)} = R^t(Rf^{(0)} - s) \\ \text{determination of } RR^t t^{(0)} \Rightarrow \alpha^{(0)}, RR^t q^{(0)} = RR^t t^{(0)} \\ p^{(1)} = p^{(0)} + \alpha^{(0)} t^{(0)} \Rightarrow f^{(1)} = f^{(0)} + \alpha^{(0)} d^{(0)} \\ q^{(1)} = q^{(0)} + \alpha^{(0)} RR^t t^{(0)} \Rightarrow r^{(1)} = r^{(0)} + \alpha^{(0)} R^t R d^{(0)} \\ \text{determination of } RR^t q^{(1)} \Rightarrow \beta^{(0)} \\ t^{(1)} = q^{(1)} + \beta^{(0)} t^{(0)} \Rightarrow d^{(1)} = r^{(1)} + \beta^{(0)} d^{(0)} \\ RR^t t^{(1)} = RR^t q^{(1)} + \beta^{(1)} RR^t t^{(1)} \Rightarrow \alpha^{(1)}. \end{cases}$$

We have shown, by recurrence, the equivalence between iteration V in the 2D image domain and iteration A in the 3D image domain.

Finally, as for the preceding algorithm, the 3D image of the object is obtained by applying the linear constraint, here $f^{(N)} = R'p^{(N)}$.

The formula of the conjugate gradient given above is that of Fletcher and Reeves, but similar reasoning is possible with other formulations of the conjugate gradient (Polak-Ribiére, Graham-Schmidt, . . . )

Similarly, the result applies for any matrix R or if the product $\overline{R}R$ is a positively defined symmetrical matrix.

Third Algorithm

This third algorithm called "block iterative" generalizes the first in that all the indices of the measurements will be split into two sub-sets of indices.

The first sub-set is denoted $\theta$ and the second is denoted $\phi$. The two sub-sets are separate, and their joining indexes all the 2D projection images.

In a first variant, the sub-set $\theta$ contains a single index (i.e. a single measurement point of the detector for a single given acquisition angle) whereas $\phi$ indexes all the other measurements (i.e. all except one). This partitioning is used in the algorithm "Algebraic Reconstruction Technique (ART)".

In a second variant, the sub-set $\theta$ indexes all the 2D images for a sub-set of angles at which the projection images are acquired, the sub-set $\phi$ indexing the complementary acquired angle positions. This partitioning is used in the algorithm "Simultaneous Algebraic Reconstruction Technique (SART)". It is noted that the case in which $\theta$ contains all the indices and $\phi$ is empty corresponds to the case of the first algorithm.

$I_\theta$ (respectively $I_\phi$) is used to denote the matrix whose coefficients are all zero except for the indices of the diagonal belonging to $\theta$ (respectively $\phi$) in which they equal 1. Since $(\theta, \phi)$ is a partition, the unit matrix in space of the 2D images is $I_\theta + I_\phi$.

It is noted that the product $I_\theta R$ (respectively $I_\phi R$) is the restriction of R at the indices of $\theta$ (respectively $\phi$). Similarly, it is noted that the product $\overline{R}I_\theta$ (respectively $\overline{R}I_\phi$) is the restriction of $\overline{R}$ at the indices of $\theta$ (respectively $\phi$).

On the basis of these definitions, the algorithm in the 3D image domain can be implemented by iteration $A_\theta$, defined as follows:

$$A_\theta[f] = (I - \rho_\theta \overline{R} I_\theta R) f + \rho_\theta \overline{R} I_\theta s$$

in which 1 is the unit matrix in the 3D image domain and $\rho_\theta$ an a priori fixed parameter so that $\|I - \rho_\theta \overline{R} I_\theta R\| < 1$.

Evidently, any reconstruction uses all the measurements to determine a solution, therefore the partitioning $(\theta, \phi)$ of indices is not constant but changes with each iteration. It is therefore a plurality of iterations $A_\theta$.

The algorithm then generates an estimate sequence $f^{(n)}$ such that:

$$f^{(n)} = A_{\theta(n)}[f^{(n-1)}] = A_{\theta(n)} A_{\theta(n-1)}[f^{(n-2)}] = A_{\theta(n)} A_{\theta(n-1)} \ldots A_{\theta(1)}[f^{(0)}]$$

It is noted that at each iteration n, the estimate is obtained from a restricted set of measurements $\theta(n)$, so that the computing time of the iteration is reduced. It is known that these techniques therefore provide solutions to the problem raised with reduced computing time. On the other hand, the problem associated with the storing of 3D images remains unchanged and independent of the chosen partitioning $(\theta, \phi)$.

It is shown here in novel manner that it is possible as previously to determine iterations $V_\theta$ in the 2D projection image domain which will lead to the same estimates as those obtained with iterations $A_\theta$.

So as only to have 2D images to store, the algorithm defined by iteration $V_\theta$ is applied by computing the estimate sequence $p^{(n)} = V_{\theta(n)}[p^{(n-1)}]$ for $n=1, \ldots, N$ with $p^{(0)}$ such that $f^{(0)} = \overline{R}' p^{(0)}$ and in accordance with the same $\theta(n)$ partitioning as used in equivalent iteration $A_\theta$. Iteration $V_\theta$ is defined for any vector p in space of the 2D projection images and for any $(\theta, \phi)$ partitioning of measurements such that $p = I_\theta p + I_\phi p$, in the following manner:

$$V_\theta[p] = (I_\theta - \rho_\theta I_\theta R\overline{R}) p + \rho_\theta I_\theta s + I_\phi p.$$

Finally, as for the two other algorithms, the 3D image of the object is obtained by determining $f^{(N)} = \overline{R} p^{(N)}$.

This third algorithm—as can be ascertained—at iteration n only modifies the variables indexed by $\theta$.

It is shown that, irrespective of $(\theta, \phi)$ partitioning, if $f = \overline{R}p$, it is possible to change over from the algorithm defined by iterations $A_\theta$ in the 3D image domain, to the algorithm defined by iterations $V_\theta$ in the 2D image domain, in the following manner:

$$\overline{R}(V_\Theta[p]) = \overline{R}((I_\Theta - \rho_\Theta I_\Theta R\overline{R})p + \rho_\Theta I_\Theta s) + \overline{R}I_\Phi p$$

$$= \overline{R}(I_\Theta p + I_\Phi p) - \rho_\Theta \overline{R}I_\Theta R\overline{R}p + \rho_\Theta \overline{R}I_\Theta s$$

$$= f - \rho_\Theta \overline{R}I_\Theta Rf + \rho_\Theta \overline{R}I_\Theta s$$

$$= A_\Theta[f]$$

As previously, iteration $V_\theta$, at any time (initialization n=0, intermediate computing 0<n<N archiving n=N) avoids having to store the entirety of a 3D image whose size is much larger than all the acquired measurements.

Application to Few-View Tomography

As already mentioned, one problem in tomography is the low number of projections when it is not possible to rotate completely around the object it is desired to image, or if the acquisition must be sub-sampled to limit the examination time or the X-ray dose to the patient. As a result, the size of the 3D image it is desired to reconstruct is much greater than the size of all the acquired 2D projection images.

By using the reconstruction algorithms such as presented, no volume is stored which means that the sampling of the volume can be finely adjusted and arbitrarily without any impact on memory storage needs.

Since the final step $f^{(N)} = \overline{R} p^{(N)}$ which, for only one slice to be viewed, is merely a linear operator applied to a low number of processed acquired 2D projection images, it can be performed in real time when viewing the slice without ever having to store all the slices of the volume.

It is noted that, depending on the desired resolution for the 3D image to be reconstructed, the number of iterations can be increased without increasing memory storage needs.

The methods presented are particularly suitable for GPUs (Graphic Processor Units) which have a good performance level with respect to computing time, but which have limited Memory.

What is claimed is:

1. A method for processing images obtained by tomography or tomosynthesis, the method comprising:
acquiring a plurality of 2D projection images of an object using an imaging system, the acquiring a plurality of 2D projection images of an object being defined by Rf=s, wherein s is a vector of the acquired projections, R is a projection operator which models the imaging system and f is a 3D image of the object to be reconstructed with knowledge of R and s;
processing the acquired 2D projection images including applying an iterative algorithm defined by its iteration, generating at least one set of processed projection images, the iteration being defined so that at each iteration the 3D image of the object is a linear function of the processed 2D projection images according to the property $f^{(n)} = \overline{R} p^{(n)}$, wherein R is a matrix such that $\overline{R}Rf$ is a 3D image, wherein at each iteration, the algorithm generates a set of processed projection images, the iteration being defined for any vector in space of the 2D projection images by:

$$V[p] = (I - \rho R\overline{R})p + \rho s,$$

wherein $p^{(0)}=\rho s$ or $p^{(0)}=0$, s is the set of acquired 2D projection images, $\rho$ is a fixed parameter so that $\|1-\rho\overline{R}R\|<1$ and thereby guarantees convergence of the method, and I is the square unit matrix.

2. The method according to claim 1, further comprising reconstructing the 3D image of the object to be determined according to the property $f^{(N)}=\overline{R}p^{(N)}$, wherein N is the number of fixed iterations.

3. The method according to claim 1, further comprising extracting a slice derived from the reconstructed 3D image.

4. A method for processing images obtained by tomography or tomosynthesis, the method comprising:
  acquiring a plurality of 2D projection images of an imaging system, the acquiring a plurality of 2D projection images of an object being defined by Rf=s, wherein s is a vector of the acquired projections, R is a projection operator which models the imaging system and f is a 3D image of the object to be reconstructed with knowledge of R and s;
  processing the acquired 2D projection images including applying an iterative algorithm defined by its iteration, generating at least one set of processed projection images, the iteration being defined so that at each iteration the 3D image of the object is a linear function of the processed 2D projection images according to the property $f^{(n)}=\overline{R}p^{(n)}$, wherein $\overline{R}$ a matrix such that $\overline{R}Rf$ is a 3D image, wherein at each iteration the algorithm generates sets of processed projection images as per the conjugate gradient method:

$$\begin{cases} \alpha^{(n-1)} = -\langle q^{(n-1)}, RR^t t^{(n-1)}\rangle / \langle RR^t t^{(n-1)}, RR^t t^{(n-1)}\rangle \\ p^{(n)} = p^{(n-1)} + \alpha^{(n-1)} t^{(n-1)} \\ q^{(n)} = q^{(n-1)} + \alpha^{(n-1)} RR^t t^{(n-1)} \\ \beta^{(n-1)} = \langle q^{(n)}, RR^t q^{(n)}\rangle / \langle q^{(n-1)}, RR^t q^{(n-1)}\rangle \\ t^{(n)} = q^{(n)} + \beta^{(n-1)} t^{(n-1)}, \end{cases}$$

wherein p, q, t are such that $p^{(0)}$ is arbitrary, typically zero or equal to the vector of the acquired 2D projection images, and $q^{(0)}=t^{(0)}=RR^tp^{(0)}-s$.

5. A method for processing images obtained by tomography or tomosynthesis, the method comprising:
  acquiring of 2D projection images of an object using an imaging system, the acquiring a plurality of 2D projection images of an object being defined by Rf=s, wherein s is a vector of the acquired projections, R is a projection operator which models the imaging system and f is a 3D image of the object to be reconstructed with knowledge of R and s;
  processing the acquired 2D projection images including applying an iterative algorithm defined by its iteration, generating at least one set of processed projection images, the iteration being defined so that at each iteration the 3D image of the object is a linear function of the processed 2D projection images according to the property $f^{(n)}=\overline{R}p^{(n)}$, wherein $\overline{R}$ is a matrix such that $\overline{R}Rf$ is a 3D image, wherein at each iteration the algorithm generates a set of projection images with $$V_{\theta(n)}[p]=(I_{\theta(n)}-\rho_{\theta(n)}I_{\theta(n)}R\overline{R})p+\rho_{\theta(n)}I_{\theta(n)}s+I_{\phi(n)}p,$$

wherein $\theta(n)$ and $\phi(n)$ are respectively a first and a second sub-set of indices of acquired projective measurements, defined for each iteration, the two sub-sets being separate, their joining indexing the entirety of the vector of the acquired 2D projection images, and $I_{\theta(n)}$ and $I_{\phi(n)}$ are matrices whose coefficients are all zero except for the indices of the diagonal belonging to $\theta(n)$ and $\phi(n)$ respectively in which their value is 1, so that $p=I_{\theta(n)}p+I_{\phi(n)}p$, in which $p^{(0)}=\rho_{\theta(n)}I_{\theta(0)}s$ or else $p^{(0)}=0$, and $\rho_{\theta(n)}$, is a fixed parameter so that $\|I_{\theta(n)}-\rho_{\theta(n)}R\overline{R}\|<1$ and thereby guarantees the convergence of the method.

6. A medical imaging system comprising:
  an acquisition system for the acquisition of a plurality of 2D projection images of an object, comprising a radiation source and a sensor;
  a storage means configured to store acquired 2D projection images; and
  a processing system configured to:
    acquire a plurality of 2D projection images of an object using the system, the acquiring a plurality of 2D projection images of an object being defined by Rf=s, wherein s is a vector of the acquired projections, R is a projection operator which models the imaging system and f is a 3D image of the object to be reconstructed with knowledge of R and s; and
    process the acquired 2D projection images including applying an iterative algorithm defined by its iteration, at each iteration n=1, . . . , N generating at least one set of processed projection images, the iteration being defined so that at each iteration the 3D image of the object is a linear function of the processed 2D projection images according to the property $f^{(n)}=\overline{R}p^{(n)}$, wherein $\overline{R}$ is a matrix such that $\overline{R}Rf$ is a 3D image, wherein at each iteration, the algorithm generates a set of processed projection images, the iteration being defined for any vector in space of the 2D projection images by:

$$V[p]=(I-\rho R\overline{R})p+\rho s,$$

wherein $p^{(0)}=\rho s$ or $p^{(0)}=0$, s is the set of acquired 2D projection images, $\rho$ is a fixed parameter so that $\|I-\rho R\overline{R}\|<1$ and thereby guarantees convergence of the method, and I is the square unit matrix.

* * * * *